US012802861B2

(12) United States Patent
Murashita et al.

(10) Patent No.: US 12,802,861 B2
(45) Date of Patent: Nov. 17, 2026

(54) REACTOR, CONVERTER, AND POWER CONVERSION APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masaya Murashita, Mie (JP); Naotoshi Furukawa, Mie (JP); Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 667 days.

(21) Appl. No.: 18/281,951

(22) PCT Filed: Mar. 2, 2022

(86) PCT No.: PCT/JP2022/008953
§ 371 (c)(1),
(2) Date: Sep. 13, 2023

(87) PCT Pub. No.: WO2022/196366
PCT Pub. Date: Sep. 22, 2022

(65) Prior Publication Data

US 2024/0161960 A1 May 16, 2024

(30) Foreign Application Priority Data

Mar. 19, 2021 (JP) ................................ 2021-045709

(51) Int. Cl.
*H01F 27/25* (2006.01)
*H01F 27/255* (2006.01)
(Continued)

(52) U.S. Cl.
CPC .......... *H01F 27/255* (2013.01); *H01F 27/28* (2013.01); *H02M 3/003* (2021.05)

(58) Field of Classification Search
CPC ....... H01F 27/255; H01F 27/28; H02M 3/003
See application file for complete search history.

(56) References Cited

U.S. PATENT DOCUMENTS

2018/0122550 A1* 5/2018 Inaba .................... H01F 27/263
2019/0189339 A1* 6/2019 Yamamoto ............ H01F 27/263
(Continued)

FOREIGN PATENT DOCUMENTS

JP 2000294429 A * 10/2000
JP 2020053432 A * 4/2020 ............. H01F 37/00
JP 2020092117 A * 6/2020 ............... H01F 1/26

OTHER PUBLICATIONS

Japanese Patent Office Decision to Grant a Patent (TRANSLATED) Jan. 6, 2025 (Year: 2025).*
(Continued)

*Primary Examiner* — Malcolm Barnes
(74) *Attorney, Agent, or Firm* — Venjuris, P.C.

(57) ABSTRACT

Provided is a reactor that includes: a coil that includes a first winding portion, and a magnetic core, the magnetic core including: a middle core portion, a first end core portion, a second end core portion, a first side core portion, and a second side core portion, and the reactor including a resin molded portion that integrates the coil and the magnetic core together. The magnetic core includes a first divided core that includes the first end core portion, and a second divided core that includes at least a part of the middle core portion. The
(Continued)

first divided core includes a first end surface and a through hole that passes through the first end core portion from an outer surface thereof to the first end surface. The second divided core includes a second end surface that faces the first end surface with a gap therebetween.

8 Claims, 8 Drawing Sheets

(51) Int. Cl.
*H01F 27/28* (2006.01)
*H02M 3/00* (2006.01)

(56) References Cited

U.S. PATENT DOCUMENTS

| | | | |
|---|---|---|---|
| 2019/0259532 A1 | 8/2019 | Hirabayashi et al. | |
| 2021/0398735 A1 | 12/2021 | Yoshikawa | |
| 2022/0115175 A1 | 4/2022 | Misaki | |

OTHER PUBLICATIONS

International Search Report issued on Jul. 5, 2022 for WO 2022/196366 A1 (4 pages).

* cited by examiner

REACTOR, CONVERTER, AND POWER CONVERSION APPARATUS

CROSS REFERENCE TO RELATED APPLICATIONS

This application is a national phase of PCT application No. PCT/JP2022/008953, filed on 2 Mar. 2022, which claims priority from Japanese patent application No. 2021-045709, filed on 19 Mar. 2021, all of which are incorporated herein by reference.

TECHNICAL FIELD

The present disclosure relates to a reactor, a converter, and a power conversion apparatus.

BACKGROUND

Constituent components of a converter provided in a hybrid automobile or the like include a reactor. The reactor described in Patent Document 1 includes a combined body formed by combining a coil and a magnetic core, and a resin molded portion that covers at least a portion of the combined body, for example. The coil includes a winding portion formed by winding a winding wire. In this reactor, a part of the resin molded portion is disposed in a gap between divided cores disposed inside the winding portion, and forms a resin gap portion.

Patent Document 2 discloses a reactor that includes one winding portion, in FIGS. 5 to 8 thereof, for example. The magnetic core of this reactor is substantially 8-shaped. This magnetic core is sectioned into a middle core portion disposed inside the winding portion, two side core portions disposed outside the outer peripheral surface of the winding portion, and two end core portions disposed on the end surfaces of the winding portion.

PRIOR ART DOCUMENT

Patent Document

Patent Document 1: JP 2017-135334 A
Patent Document 2: JP 2016-201509 A

SUMMARY OF THE INVENTION

A reactor according to the present disclosure includes: a coil that includes a first winding portion, and a magnetic core, the magnetic core includes: a middle core portion disposed inside the first winding portion, a first end core portion that faces a first end surface of the first winding portion, a second end core portion that faces a second end surface of the first winding portion, a first side core portion that is disposed on an outer side of a first side surface of the first winding portion, and connects the first end core portion and the second end core portion to each other, and a second side core portion that is disposed on an outer side of a second side surface of the first winding portion, and connects the first end core portion and the second end core portion to each other, and the reactor further includes a resin molded portion that integrates the coil and the magnetic core together. The magnetic core includes a first divided core that includes the first end core portion, and a second divided core that includes at least a part of the middle core portion. The first divided core includes a first end surface that faces an internal space of the first winding portion, and a through hole that passes through the first end core portion from an outer surface thereof to the first end surface. The second divided core includes a second end surface that faces the first end surface with a gap therebetween. A part of the resin molded portion is disposed in the through hole and the gap.

A converter according to the present disclosure includes the reactor according to the present disclosure.

A power conversion apparatus according to the present disclosure includes the converter according to the present disclosure.

DETAILED DESCRIPTION TO EXECUTE THE INVENTION

Figure 1:
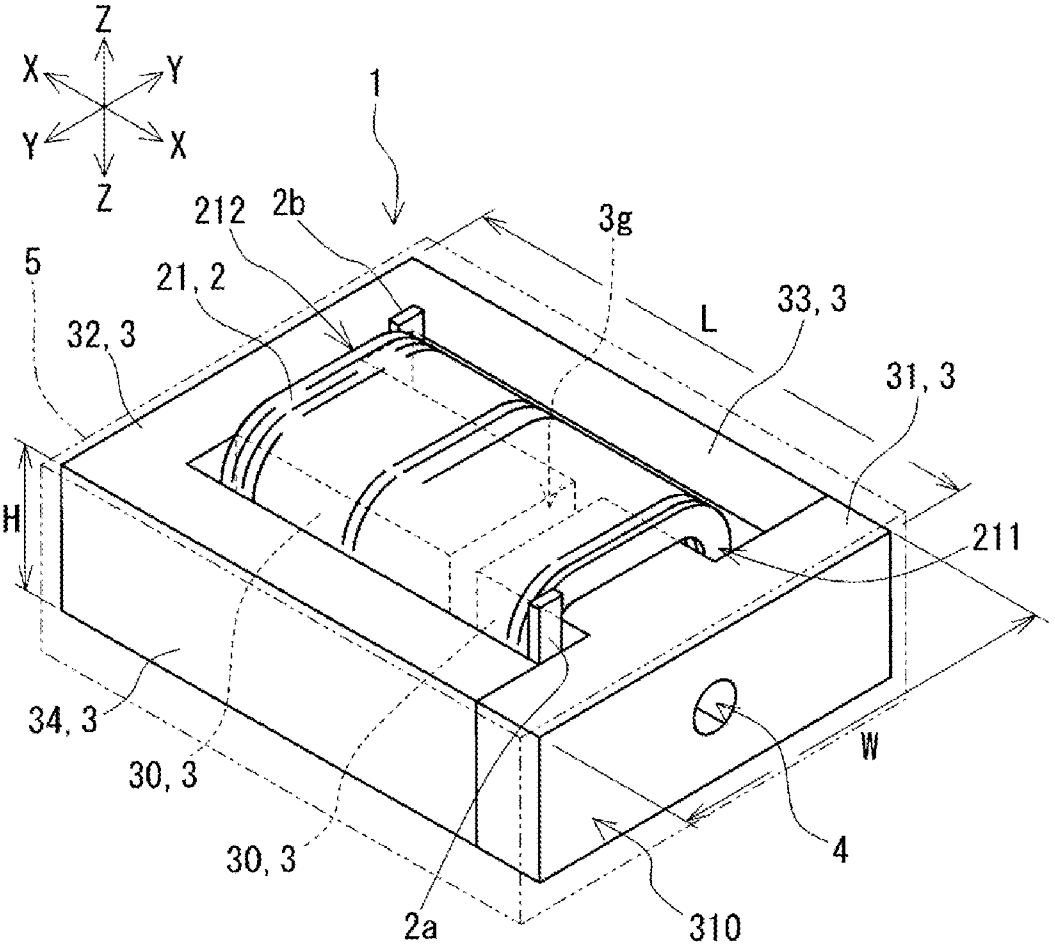
FIG. 1 is a schematic perspective view of a reactor according to a first embodiment.

Problem to be Solved by the Present Disclosure

In accordance with development of electric vehicles such as hybrid automobiles, there has been a demand for a reactor that has a simple configuration that ensures high productivity. In addition, a current that is carried to a reactor tends to be large, and thus there is a demand for a reactor that has high heat dissipation with a simple configuration.

An object of the present disclosure is to provide a reactor that has high heat dissipation with a simple configuration. In addition, an object of the present disclosure is to provide a converter that includes a reactor that has high heat dissipation with a simple configuration, and a power conversion apparatus.

Advantageous Effects of the Present Disclosure

A reactor according to the present disclosure has high heat dissipation with a simple configuration. In addition, the performances of a converter and a power conversion apparatus according to the present disclosure are unlikely to decrease due to heat generation caused by current-carrying.

DESCRIPTION OF EMBODIMENTS OF THE PRESENT DISCLOSURE

The present inventors examined a reactor having the following three configuration, as a reactor having a simple configuration.

a configuration in which a magnetic core is a substantially 8-shaped magnetic core formed by combining a first divided core and a second divided core.

a configuration in which a gap is formed between the first divided core and the second divided core, at the position of a middle core portion of the above magnetic core.

a configuration in which a combined body formed by combining the magnetic core and a coil is molded using a resin, and a part of the resin is disposed in the above gap.

However, a resin is unlikely to sufficiently spread in the above gap disposed at the position of the middle core portion in the reactor that has the above configurations. If the gap is not sufficiently filled with a resin, an air pocket in which there is no resin is formed in the above gap. The air pocket inhibits heat conduction between the first divided core and the second divided core, and thus the heat dissipation of the reactor decreases. The present inventors accomplished a reactor according to the present disclosure on the basis of such a problem. First, embodiments of the present disclosure will be listed and described.

(1) A reactor according to an embodiment including: a coil that includes a first winding portion, and a magnetic core, the magnetic core including: a middle core portion disposed inside the first winding portion, a first end core portion that faces a first end surface of the first winding portion, a second end core portion that faces a second end surface of the first winding portion, a first side core portion that is disposed on an outer side of a first side surface of the first winding portion, and connects the first end core portion and the second end core portion to each other, and a second side core portion that is disposed on an outer side of a second side surface of the first winding portion, and connects the first end core portion and the second end core portion to each other, and the reactor further includes a resin molded portion that integrates the coil and the magnetic core together. The magnetic core includes a first divided core that includes the first end core portion, and a second divided core that includes at least a part of the middle core portion. The first divided core includes a first end surface that faces an internal space of the first winding portion, and a through hole that passes through the first end core portion from an outer surface thereof to the first end surface. The second divided core includes a second end surface that faces the first end surface with a gap therebetween. A part of the resin molded portion is disposed in the through hole and the gap.

The reactor in the above aspect (1) has a simple configuration. The magnetic core of the reactor having the above configuration is constituted by the first divided core and the second divided core. Therefore, this reactor is manufactured by attaching the first divided core and the second divided core to the coil, and integrating the coil and the magnetic core together using a resin. The resin for integrating the coil and the magnetic core solidifies and thus is formed into a resin molded portion. As described above, the reactor having the above configuration has a simple configuration, and ensures high productivity.

The reactor in the above aspect (1) has high heat dissipation. At the time of manufacturing of the reactor, a part of the resin that integrates the coil and the magnetic core flows into the through hole in the first end core portion. The through hole passes through the first end core portion from the outer surface thereof to the first end surface. Therefore, a sufficient amount of resin is likely to fill the gap between the first end surface and the second end surface via the through hole. The resin disposed in the gap solidifies and is formed into a resin gap. An air pocket is unlikely to be formed in the resin gap formed of a sufficient amount of resin. The resin gap that has few air pocket realizes favorable heat conduction between the first divided core and the second divided core. Therefore, the heat dissipation of the reactor improves.

In the above configuration, when the resin is molded, the resin flows into the through hole, decreasing a surface pressure that acts on the outer surface of the first end core portion. Therefore, even if the molding pressure is high, the first end core portion is unlikely to be damaged. If the pressure is high, it is easy for the resin to sufficiently spread so as to reach not only the gap between the first end surface and the second end surface but also the gap between the middle core portion and the first winding portion.

The through hole is provided in the first divided core, and thus the substantial part of the first divided core decreases. Therefore, the weight of the reactor having the above configuration is light compared with a reactor in which no through hole is provided in a first divided core. Here, as will be described in detail in the embodiments below, the position at which the through hole is provided is a location where the magnetic flux of the magnetic core is unlikely to pass. Therefore, a decrease in the magnetic properties of the reactor due to the through hole is limited.

(2) In the reactor according to the embodiment, an axis line of the through hole may extend along an axial direction of the middle core portion, and the through hole may include an axial center of the middle core portion.

The through hole is disposed at a position so as to include the axis center of the middle core portion, and thus the through hole is unlikely to decrease the magnetic properties of the magnetic core.

(3) In the reactor according to the embodiment, S1/S2 may be 0.02 or larger and 0.15 or smaller, where S1 may indicate an area of a transverse section of the through hole, and S2 may indicate an area inside a contour line of a transverse section of the middle core portion.

With the configuration of the above aspect (3), the weight of the reactor is reduced without decreasing the magnetic properties of the reactor significantly.

(4) In the reactor according to the embodiment, the second end surface may include an annular rib provided along an outer peripheral edge portion of the second end surface.

The second end surface includes the annular rib, and thus, at the time of manufacturing of the reactor, the resin that has entered the gap from the through hole is likely to stay at the position of the gap. Therefore, with the configuration in the above aspect (4), an air pocket is unlikely to be formed in the resin gap.

(5) In the reactor according to the embodiment, the first divided core may be substantially T-shaped, constituted by the first end core portion and at least a part of the middle core portion, and the second divided core may be substantially E-shaped, constituted by the second end core portion, a remaining part of the middle core portion, the first side core portion, and the second side core portion.

With the configuration in the above aspect (5), the divided cores have simple shapes, and thus it is easy to manufacture the divided cores. Therefore, the reactor in the above aspect (5) ensures high productivity, which includes cost efficiency.

(6) In the reactor according to an embodiment, the first divided core may be a power compact molded body that contains soft magnetic powder.

The magnetic properties such as magnetic permeability of the power compact molded body is high. A decrease in the magnetic properties of the first divided core caused by the through hole can be compensated for by the first divided core being formed by a power compact molded body. Therefore, it is possible to manufacture the reactor that has high magnetic properties even if the first divided core includes the through hole.

(7) In the reactor according to the embodiment, the second divided core may be a molded body made of a composite material that contains a resin and soft magnetic powder dispersed in the resin.

The magnetic properties of the molded body made of the composite material can be easily adjusted based on the content of soft magnetic powder. It is possible to achieve a magnetic core that is unlikely to be magnetically saturated, by adjusting the magnetic properties of the entire magnetic core using the second divided core made of a composite material, for example.

(8) A converter according to an embodiment includes the reactor according to any one of the above aspects (1) to (7).

The above converter includes the reactor that has higher heat dissipation according to the embodiment. The magnetic properties of the reactor that has higher heat dissipation according to the embodiment are unlikely to decrease due to heat generation caused by current-carrying. Therefore, performances of the above converter are unlikely to decrease due to current-carrying.

(9) A power conversion apparatus according to an embodiment includes the converter in the above aspect (8).

Performance degradation of the power conversion apparatus due to current-carrying is unlikely to occur. This is because the reactor according to the embodiment provided in the power conversion apparatus has high heat dissipation.

DETAILS OF EMBODIMENTS OF THE PRESENT DISCLOSURE

Embodiments of a reactor according to the present disclosure will be described below with reference to the drawings. The same reference numerals in the drawings indicate articles that have the same names Note that the present invention is not limited to configurations described in the embodiments, but rather is indicated by the claims, and is intended to include all modifications that are within the meanings and the scope that are equivalent to those of the claims.

First Embodiment

Figure 2:
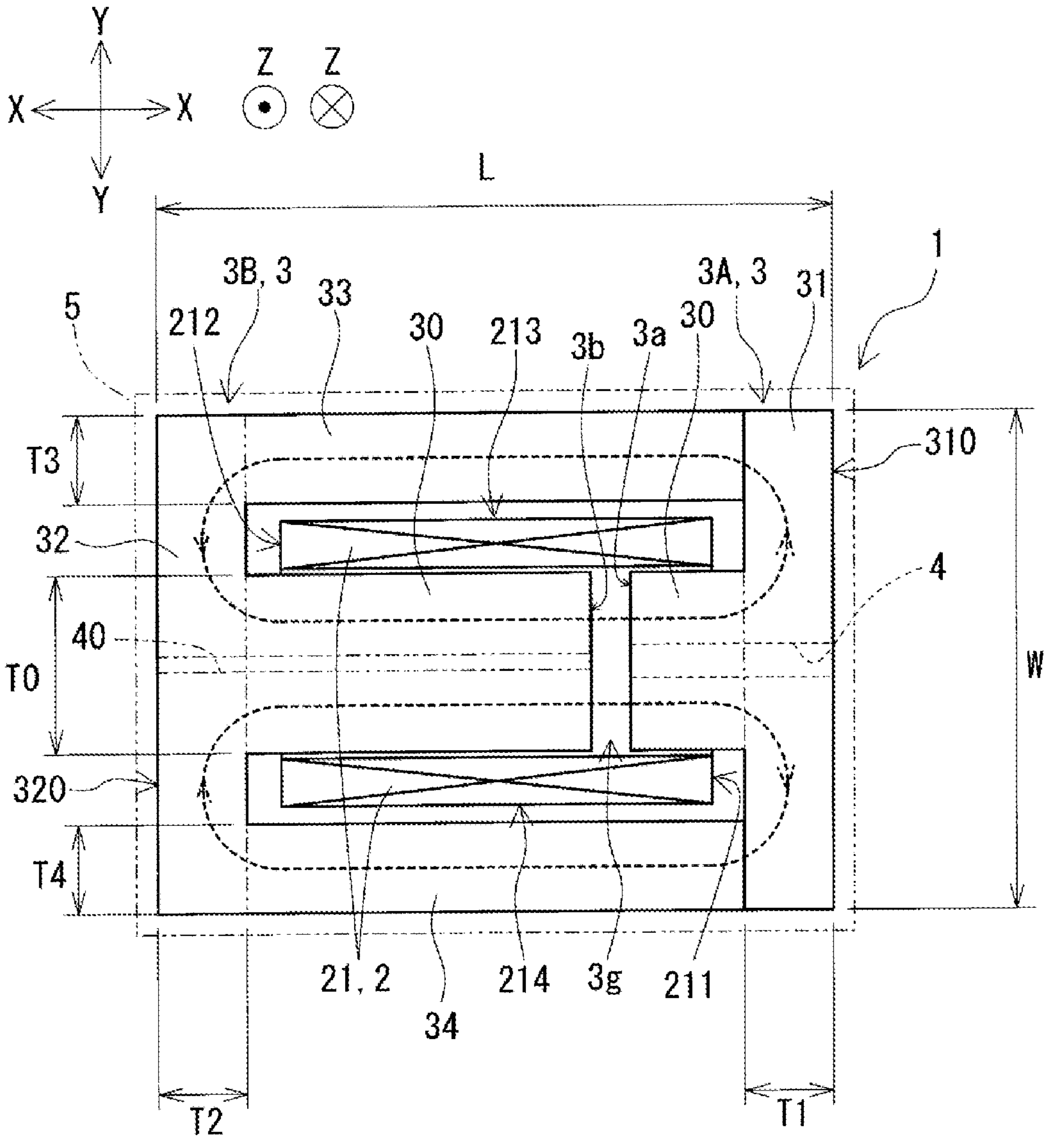
FIG. 2 is a schematic top view of the reactor according to the first embodiment.

A reactor 1 in this example shown in FIGS. 1 and 2 is constituted by combining a coil 2 and a magnetic core 3. As a characteristic of the reactor 1, a through hole 4 is provided in a part of the magnetic core 3. Constituent elements provided in the reactor 1 will be described below in detail.

Coil

The coil 2 includes one first winding portion 21. The first winding portion 21 is configured by winding one winding wire that include no joint portion, in a spiral manner A known winding wire can be used as the winding wire. A coated rectangular wire is used as the winding wire in the present embodiment. The conductor line of the coated rectangular wire is formed by a rectangular copper wire. Insulating coating of the coated rectangular wire is formed of enamel. The first winding portion 21 is formed by an edgewise coil obtained by edgewise-winding the coated rectangular wire.

The first winding portion 21 is shaped as a rectangular tube. That is to say, the end surfaces of the first winding portion 21 in this example are shaped as a rectangular frame. The corner portions of the first winding portion 21 in this example are rounded. Since the first winding portion 21 is shaped as a rectangular tube, the contact area between the first winding portion 21 and an installation target is likely to be large compared with a case where a winding portion has a cylindrical shape with a consistent cross-section area. Therefore, the reactor 1 is likely to dissipate heat to the installation target via the first winding portion 21. Moreover, the first winding portion 21 can be easily installed on the installation target in a stable manner.

An end portion 2*a* and an end portion 2*b* of the first winding portion 21 are respectively extended to the outer peripheral side of the first winding portion 21, on one end side and the other end side in the axial direction of the first winding portion 21. The insulating coating is peeled away at the end portion 2*a* and the end portion 2*b* of the first winding portion 21, so as to expose the conductor line. A terminal member (not shown) is connected to the exposed conductor line. An external apparatus is connected to the coil 2 via this terminal member. The external apparatus is not illustrated. The external apparatus is a power source or the like that supplies power to the coil 2, for example.

Magnetic Core

As shown in FIG. 2, the magnetic core 3 includes a middle core portion 30, a first end core portion 31, a second end core portion 32, a first side core portion 33, and a second side core portion 34. In FIG. 2, the boundaries between the core portions 30, 31, 32, 33, and 34 are indicated with dashed-two dotted lines. The middle core portion 30 is a section that includes a part of the magnetic core 3 that is disposed in the first winding portion 21. The first end core portion 31 is a part of the magnetic core 3 that faces a first end surface 211 of the first winding portion 21. The second end core portion 32 is a part of the magnetic core 3 that faces a second end surface 212 of the first winding portion 21. The first side core portion 33 is a part of the magnetic core 3 that is disposed on the outer side of a first side surface 213 of the first winding portion 21. The second side core portion 34 is a part of the magnetic core 3 that is disposed on the outer side of a second side surface 214 of the first winding portion 21.

In this magnetic core 3, an annular closed magnetic path indicated with a thick broken line is formed across the middle core portion 30, the first end core portion 31, the first side core portion 33, and the second end core portion 32. In addition, an annular closed magnetic path indicated with a thick broken line is formed across the middle core portion 30, the first end core portion 31, the second side core portion 34, and the second end core portion 32.

Here, directions in the reactor 1 are defined based on the magnetic core 3. First, a direction extending along the axial direction of the middle core portion 30 is an X direction. A direction that is orthogonal to the X direction and in which the middle core portion 30, the first side core portion 33, and the second side core portion 34 are disposed in parallel is a Y direction. Moreover, a direction that intersects both the X direction and the Y direction is a Z direction (FIG. 1).

Middle Core Portion

As shown in FIG. 2, the middle core portion 30 that is a part of the magnetic core 3 is disposed inside the first winding portion 21. Therefore, the middle core portion 30 extends along the axial direction of the first winding portion 21. In this example, the two end portions of a part of the magnetic core 3 that extends along the axial direction of the first winding portion 21 protrude from the first end surface 211 and the second end surface 212 of the first winding portion 21, respectively. The protruding portions are also portions of the middle core portion 30.

The shape of the middle core portion 30 is not particularly limited as long as it follows the internal shape of the first winding portion 21. The middle core portion 30 in this example is shaped substantially as a rectangular parallelepiped.

First End Core Portion and Second End Core Portion

The first end core portion 31 and the second end core portion 32 are larger than the width in the Y direction of the first winding portion 21. That is to say, the first end core portion 31 protrudes on the outer side in the Y direction relative to the first end surface 211 of the first winding portion 21. The second end core portion 32 protrudes on the outer side in the Y direction relative to the second end surface 212 of the first winding portion 21.

The shapes of the first end core portion 31 and the second end core portion 32 are not particularly limited as long as a sufficient magnetic path is formed in the end core portions 31 and 32. The first end core portion 31 and the second end core portion 32 in this example are shaped substantially as a rectangular parallelepiped. Two corner portions disposed at positions distant from the two side core portions 33 and 34, among the four corner portions of each of the first end core portion 31 and the second end core portion 32 as viewed from the Z direction, may be rounded. If the above two corner portions are rounded, the weight of the end core portions 31 and 32 is reduced. The above two corner portions are locations where a magnetic flux is unlikely to pass. Therefore, even if the above two corner portions are rounded, the magnetic properties of the reactor 1 are unlikely to decrease.

The first end core portion 31 in this example includes the through hole 4 provided in an outer surface 310. The outer surface 310 is a surface disposed at a position distant from the coil 2, among the two surfaces that face in the X direction of the first end core portion 31. The weight of the first end core portion 31 is reduced due to this through hole 4. The through hole 4 will be described later in detail.

First Side Core Portion and Second Side Core Portion

On the outer side of the first side surface 213 of the first winding portion 21, the first side core portion 33 connects the first end core portion 31 and the second end core portion 32 to each other. The axial direction of the first side core portion 33 is parallel to the axial direction of the middle core portion 30. The first side surface 213 is a surface of the first winding portion 21 that faces in the Y direction.

On the outer side of the second side surface 214 of the first winding portion 21, the second side core portion 34 connects the first end core portion 31 and the second end core portion 32 to each other. The second side surface 214 is a surface that faces in the Y direction of the first winding portion 21, and faces in the opposite direction of the first side surface 213. The axial direction of the second side core portion 34 is parallel with the axial direction of the middle core portion 30. In this example, the axis line of the middle core portion 30, the axis line of the first side core portion 33, and the axis line of the second side core portion 34 are disposed on the XY plane.

Size

If the reactor 1 in this example is an onboard reactor, a length L in the X direction of the magnetic core 3 is 30 mm or larger and 150 mm or smaller, for example, a width W in the Y direction of the magnetic core 3 is 30 mm or larger and 150 mm or smaller, for example, and a height H (FIG. 1) in the Z direction is 15 mm or larger and 75 mm or smaller, for example.

A length TO in the Y direction of the middle core portion 30 is 10 mm or larger and 50 mm or smaller, for example. A length T1 in the X direction of the first end core portion 31 and a length T2 in the X direction of the second end core portion 32 are each 5 mm or larger and 40 mm or smaller, for example. In addition, a length T3 in the Y direction of the first side core portion 33 and a length T4 in the Y direction of the second side core portion 34 are each 5 mm or larger and 40 mm or smaller, for example. These lengths are related to the size of a cross-section area of the magnetic path of the magnetic core 3.

Division Aspect

The magnetic core 3 is formed by combining a first divided core 3A and a second divided core 3B. The first divided core 3A in this example is constituted by the first end core portion 31 and a part of the middle core portion 30. The first divided core 3A as viewed from the Z direction is substantially T-shaped. The first divided core 3A includes a first end surface **3*a* that faces the internal space of the first winding portion 21. The first end surface 3*a*** is parallel with the Y-Z plane.

The second divided core 3B in this example is constituted by the second end core portion 32, the first side core portion 33, the second side core portion 34, and a part of the middle core portion 30. The second divided core 3B as viewed from the Z direction is substantially E-shaped. The second divided core 3B includes a second end surface **3*b* that faces the internal space of the first winding portion 21. The second end surface 3*b* faces the first end surface 3*a*. The second end surface 3*b*** is parallel with the Y-Z plane.

A gap **3*g* is formed between the first end surface 3*a* and the second end surface 3*b*. A part of a resin molded portion 5, which will be described later, is disposed in this gap 3*g*. The part of the resin molded portion 5 that is disposed in the gap 3*g*** functions as a resin gap.

Magnetic Properties, Material, etc.

Each of the first divided core 3A and the second divided core 3B is preferably a power compact molded body formed by pressuring base powder that contains soft magnetic powder, or a molded body made of a composite material of soft magnetic powder and a resin. The first divided core 3A and the second divided core 3B may be power compact molded bodies, or the first divided core 3A and the second divided core 3B may be molded bodies made of a composite material. In addition, a configuration may also be adopted in which one of the first divided core 3A and the second divided core 3B is a power compact molded body, and the other is a molded body made of a composite material. The magnetic core 3 having such a configuration is unlikely to be magnetically saturated. Preferably, the first divided core 3A in which the through hole 4, which will be described later, is provided is formed by a power compact molded body, and the second divided core 3B is formed by a molded body made of a composite material.

Soft magnetic powder that forms a power compact molded body is an aggregate of soft magnetic particles of iron group metal such as iron, an iron alloy such as an Fe (iron)-Si (silicon) alloy or an Fe—Ni (nickel) alloy, or the like. Insulating coating made of phosphate and the like may be formed on the surfaces of the soft magnetic particles. The base powder may contain antifriction and the like.

The molded body made of a composite material can be manufactured by filling a metal mold with a mixture of soft magnetic powder and an unsolidified resin, and solidifying the resin. The same materials as those can be used for the power compact molded body can be used as the soft magnetic powder in the composite material. On the other hand, examples of the resin contained in the composite material include a thermo—setting resin, a thermoplastic resin, an ordinary temperature-curable resin, a low temperature curable resin, and the like. Examples of the thermo-setting resin include an unsaturated polyester resin, an epoxy resin, an urethane resin, and a silicone resin. Examples of the thermoplastic resin include a polyphenylene sulfide (PPS) resin, a polytetrafluoroethylene (PTFE) resin, a liquid crystal polymer (LCP), a polyamide (PA) resin such as nylon 6 or nylon 66, a polybutylene terephthalate (PBT) resin, and an acrylonitrile butadiene styrene (ABS) resin. Other than that, BMC (Bulk molding compound) obtained by mixing unsaturated polyester with calcium carbonate and glass fiber, millable silicone rubber, millable urethane rubber, and the like can also be used.

The above composite material may contain non-metallic powder in addition to the soft magnetic powder and the resin. The non-metallic powder improves heat dissipation of the molded body made of the composite material. The non-metallic powder is a ceramics filler of alumina, silica or the like. The ceramics filler is also a nonmagnetic material. The content of non-metallic powder may be 0.2 mass % or higher and 20 mass % or lower, 0.3 mass % or higher and 15 mass % or lower, or 0.5 mass % or higher and 10 mass % or lower.

The content of soft magnetic powder in the composite material is 30 volume % or higher and 80 volume % or lower, for example. Furthermore, from the viewpoint of improvement in the saturated magnetic flux density and the heat dissipation, the content of soft magnetic powder may also be 50 volume % or higher, 60 volume % or higher, or 70 volume % or higher. From the viewpoint of improvement in the fluidity in a manufacturing process, the content of soft magnetic powder is preferably 75 volume % or lower. The relative magnetic permeability of the molded body made of the composite material can be easily reduced by adjusting the filling rate of soft magnetic powder to a low rate. The relative magnetic permeability of the molded body made of the composite material is 5 or higher and 50 or lower, for example. Furthermore, the relative magnetic permeability of the molded body made of the composite material may also be 10 or higher and 45 or lower, 15 or higher and 40 or lower, or 20 or higher and 35 or lower. In this example, the entire second divided core 3B is formed by the molded body made of the composite material.

The content of soft magnetic powder in the power compact molded body can be more easily increased than in the molded body made of the composite material. The content of soft magnetic powder in the power compact molded body exceeds 80 volume % or further 85 volume %, for example. A divided core formed by a power compact molded body can be easily formed into a divided core that has high saturated magnetic flux density and relative magnetic permeability. The relative magnetic permeability of the power compact molded body is 50 or higher and 500 or lower, for example. The relative magnetic permeability of the power compact molded body may also be 80 or higher, 100 or higher, 150 or higher, or 180 or higher. In this example, the entirety of the first divided core 3A that includes the through hole 4 is formed by the power compact molded body.

Through Hole

Figure 3:
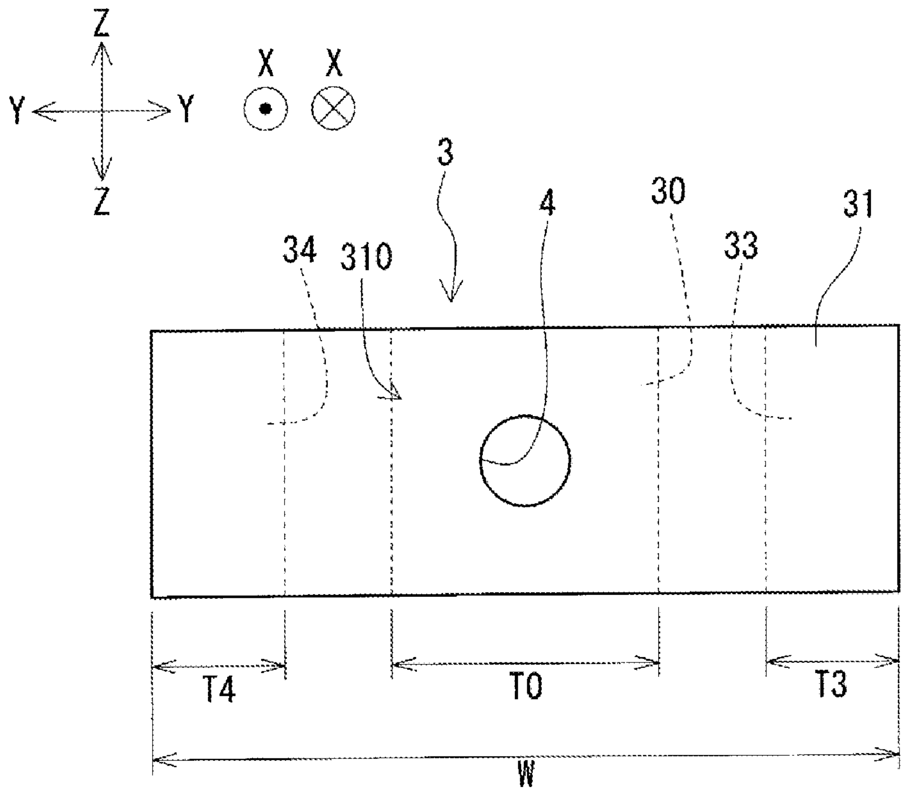
FIG. 3 is a schematic front view of a magnetic core provided in the reactor in FIG. 1.

The first divided core 3A includes the through hole 4. The through hole 4 passes through the first divided core 3A from the outer surface 310 to the first end surface 3*a*. The through hole 4 is a passage for a resin that forms the later-described resin molded portion 5. As shown in FIG. 3, the opening of the through hole 4 in the outer surface 310 is preferably disposed inside the outer peripheral contour line of the middle core portion 30 as viewed from the X direction.

The axis line of the through hole 4 preferably extends along the X direction. In addition, the through hole 4 preferably includes the axis line of the middle core portion 30. The axis line includes the area centroid in the Y-Z cross-section of the middle core portion 30. The two closed magnetic paths formed in the magnetic core 3 in this example extend in a direction separating from each other in the Y direction from the axis line of the middle core portion 30 (see FIG. 2). Therefore, the magnetic flux is unlikely to pass at the position of the through hole 4 in the first divided core 3A. Therefore, even if the through hole 4 is provided in the first divided core 3A, the magnetic properties of the reactor 1 are unlikely to decrease.

The shape of a transverse section of the through hole 4 is not particularly limited. The transverse section of the through hole 4 is a cross-section orthogonal to the extending direction of the through hole 4. In the case of this example, the transverse section of the through hole 4 is a Y-Z cross-section of the through hole 4. The shape of the transverse section of the through hole 4 in this example is a perfect circle. The cross-sectional shape may be an oval shape, may be a polygon that has a large number of rectangles, or may be an odd shape such as a star shape.

The area of the transverse section of the through hole 4 preferably satisfies Expression 1 below. S1 indicates the area of the transverse section of the through hole 4. S2 indicates the area inside the contour line of transverse section of the middle core portion 30.

$$0.02 \leq S1/S2 \leq 0.15 \qquad \text{Expression (1)}$$

When S1/S2 is 0.02 or larger, the resin that forms the resin molded portion 5 (FIGS. 1 and 2) is likely to flow through the through hole 4. In addition, the weight of the first divided core 3A is reduced, and the weight of the reactor is reduced. When S1/S2 is 0.15 or smaller, a decrease in the magnetic properties of the magnetic core 3 due to the through hole 4 being provided is suppressed. The lower limit value of S1/S2 is preferably 0.03, more preferably 0.04. The upper limit value of S1/S2 is preferably 0.14, more preferably 0.12. A preferred range of S1/S2 is 0.04 or larger and 0.12 or smaller.

The absolute value of the area of the transverse section of the through hole 4 is preferably 40 $mm^2$ or larger. In this case, the flowability of the resin in the through hole 4 can be sufficiently secured irrespective of a type of resin that forms the resin molded portion 5.

Resin Molded Portion

As shown in FIGS. 1 and 2, the resin molded portion 5 integrates the coil 2 and the magnetic core 3 together. The resin molded portion 5 may cover the entirety of the combination of the coil 2 and the magnetic core 3, or may cover only a portion of the combination. In a case where the resin molded portion 5 covers only a portion of the combination, the resin molded portion 5 at least covers the through hole 4 in the outer surface 310. In a configuration in which at least a part of the outer peripheral surface of the first winding portion 21 is exposed from the resin molded portion 5, heat dissipation from the coil 2 can be easily facilitated.

The resin molded portion 5 is formed by disposing the combination of the coil 2 and the magnetic core 3 in the metal mold, and molding a resin, for example. A part of the resin enters the gap 3*g* via the through hole 4. The resin solidifies, and, as a result, the resin molded portion 5 is formed. A part of the resin molded portion 5 is disposed in the through hole 4 and the gap 3*g*. The part of the resin molded portion 5 disposed in the gap 3*g* functions as a resin gap.

A part of the resin molded portion 5 in this example is also disposed between the inner periphery surface of the first winding portion 21 and the outer periphery of the middle core portion 30. The part of the resin molded portion 5 disposed at this position tightly integrates the first winding portion 21 and the middle core portion 30 together.

The same resins as those can be used as the resin contained in the composite material can be use as the resin that forms the resin molded portion 5. Example of the resin that forms the resin molded portion 5 include a PBT resin and the like. These resins may contain a ceramics filler of alumina or the like.

Others

As indicated with the dashed-two dotted lines in FIG. 2, a through hole 40 may also be provided in the second divided core 3B. The through hole 40 passes through the second divided core 3B from an outer surface 320 thereof to the second end surface 3*b*. In this case, the volume of the through hole 40 is preferably the same as the volume of the through hole 4 of the first divided core 3A. If the volume of the through hole 4 and the volume of the through hole 40 are the same, the resin flowing through the through hole 4 and the resin flowing through the through hole 40 are likely to reach the gap 3*g* at substantially the same timing.

The reactor 1 may also include at least one of a case, an adhesive layer, and a holding member. The case is a member that accommodates the combined body of the coil 2 and the magnetic core 3. The combined body accommodated in the case may be buried using a sealing resin portion. The adhesive layer fixes the above combined body to a placement surface, the above combined body to an inner bottom surface of the case, and the above case to the placement surface and the like. The holding member is a member that is disposed between the coil 2 and the magnetic core 3, and defines the relative position between the coil 2 and the magnetic core 3. The holding member is formed of an insulative resin, and secures insulation between the coil 2 and the magnetic core 3.

OVERVIEW

The reactor 1 in this example ensures high productivity.

The number of components that constitute the reactor 1 in this example is small. In addition, simply by molding the combination of the coil 2 and the magnetic core 3 using a resin, the coil 2 and the magnetic core 3 are integrated together, and a resin gap is formed in the magnetic core 3. Therefore, the reactor 1 in this example ensures high productivity.

The reactor 1 in this example has high heat dissipation.

At the time of manufacturing of the reactor 1 in this example, a part of the resin for integrating the coil 2 and the magnetic core 3 together flows into the through hole 4 of the first end core portion 31. The through hole 4 passes through the first end core portion 31 from the outer surface 310 to the first end surface 3*a*. Therefore, a sufficient amount of resin is likely to fill the gap 3*g* between the first end surface 3*a* and the second end surface 3*b* via the through hole 4. The resin disposed in the gap 3*g* solidifies and is formed into a resin gap. No air pocket is likely to be formed in the resin gap formed of a sufficient amount of resin. The resin gap that has few air pocket increases heat conduction between the first divided core 3A and the second divided core 3B. Therefore, the heat dissipation of the reactor 1 improves.

The weight of the reactor 1 in this example that includes the through hole 4 is light compared with a conventional reactor that does not include the through hole 4.

In the reactor 1 in this example, the through hole 4 is provided in the first divided core 3A, and thus the substantial part of the first end core portion 31 decreases. Therefore, the weight of the reactor 1 decreases. In addition, the substantial part of the first end core portion 31 decreases, and thus the productivity of the magnetic core 3, in other words, the productivity of the reactor 1, which includes the cost efficiency, improves.

The reactor 1 in this example has magnetic properties that are about the same as those of a reactor that does not include the through hole 4.

In the reactor 1 in this example, the through hole 4 is provided in an intermediate portion in the Y direction of the outer surface 310 of the first end core portion 31. This intermediate portion is a location where a magnetic flux is unlikely to pass. Therefore, a decrease in the magnetic properties of the reactor 1 caused by the through hole 4 being provided in the magnetic core 3 is suppressed.

In the reactor 1 in this example, when molding a resin, the resin flows into the through hole 4, and the surface pressure that acts on the outer surface 310 of the first end core portion 31 decreases. Therefore, even if the pressure of molding is high, the first end core portion 31 is unlikely to be damaged. If the pressure is high, it is easy for a resin to sufficiently spread so as to reach not only the gap 3*g* between the first end surface 3*a* and the second end surface 3*b*, but also the gap between the middle core portion 30 and the first winding portion 21.

Second Embodiment

A reactor 1 according to a second embodiment will be described with reference to FIGS. 4 and 5. The reactor 1 according to the second embodiment differs from the reactor 1 according to the first embodiment in the configuration of the second end surface 3*b*. Configurations other than the configuration of the second end surface 3*b* of the reactor 1 in this example are the same as those of the reactor 1 according to the first embodiment.

Figure 4:
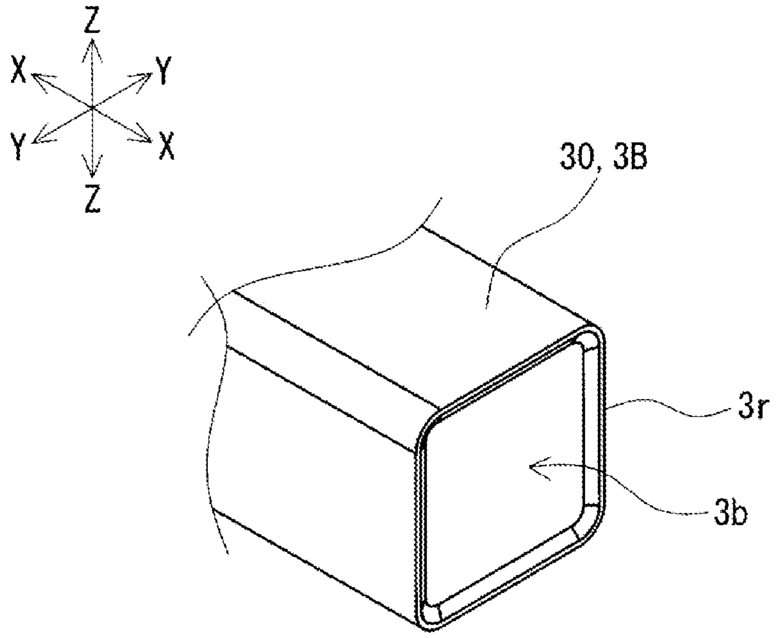
FIG. 4 is a partially enlarged perspective view showing a second end surface of a magnetic core provided in a reactor according to a second embodiment and a region surrounding the second end surface.
Figure 5:
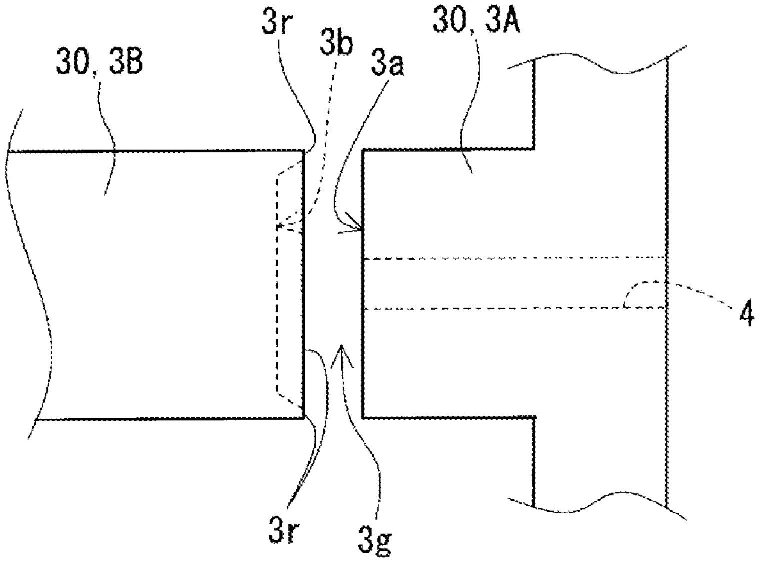
FIG. 5 is a schematic partial top view of the magnetic core provided in the reactor according to the second embodiment.

As shown in FIGS. 4 and 5, the second end surface 3*b* of the second divided core 3B in this example includes an annular rib 3*r* provided along the outer peripheral edge portion thereof. The rib 3*r* in this example is shaped as an annular rectangle. An aspect may be adopted in which the rib 3*r* has no discontinuity in the circumferential direction or an aspect may also be adopted in which the rib 3*r* has discontinuity.

The outer peripheral surface of the rib 3*r* in this example is flush with the outer peripheral surface of the middle core portion 30. The inner periphery surface of the rib 3*r* is inclined on the axis line side of the middle core portion 30 toward the second end surface 3*b*.

The second end surface 3*b* includes the annular rib 3*r*, and thus the resin that has entered the gap 3*g* from the through hole 4 at the time of manufacturing of the reactor 1 is likely to stay at the position of the gap 3*g*. Therefore, an air pocket is unlikely to be formed in the resin gap.

Third Embodiment

Figure 6:
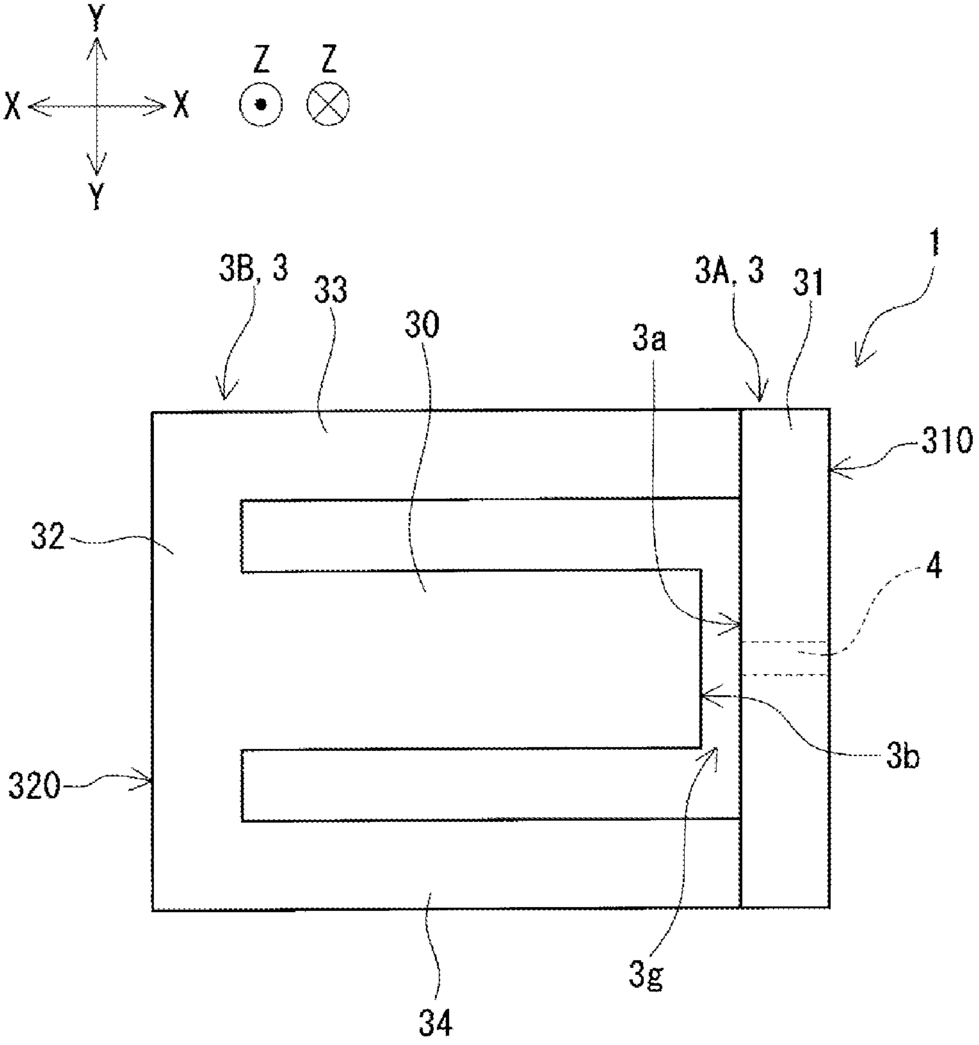
FIG. 6 is a schematic top view of a magnetic core provided in a reactor according to a third embodiment.

A reactor 1 according to a third embodiment will be described with reference to FIG. 6. FIG. 6 shows only the magnetic core 3 provided in the reactor 1. The reactor 1 according to the third embodiment differs from the reactor 1 according to the first and second embodiments in the division state of the magnetic core 3. Configurations other than the division state of the magnetic core 3 of the reactor 1 in this example are the same as those of the reactor 1 according to the first and second embodiments.

The first divided core 3A in this example is constituted by the first end core portion 31. The through hole 4 is provided in the first end core portion 31. The first divided core 3A as viewed from the Z direction is substantially I-shaped. The first divided core 3A is preferably formed by a power compact molded body.

The second divided core 3B in this example is constituted by the middle core portion 30, the second end core portion 32, the first side core portion 33, and the second side core portion 34. The second divided core 3B as viewed from the Z direction is substantially E-shaped. The second divided core 3B is preferably formed by a molded body made of a composite material.

Also according to the reactor 1 in this example, effects that are similar to those of the reactor 1 according to the first embodiment are achieved.

Fourth Embodiment

Figure 7:
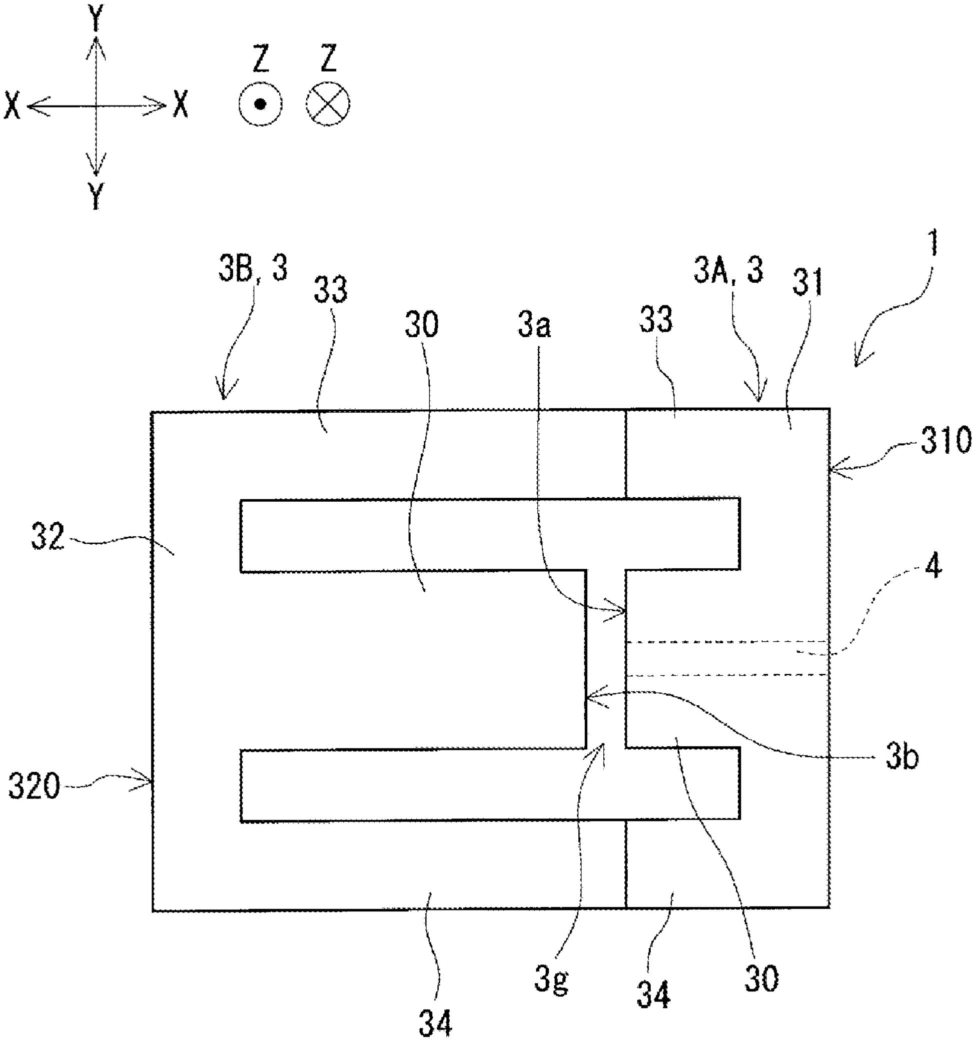
FIG. 7 is a schematic top view of a magnetic core provided in a reactor according to a fourth embodiment.

A reactor 1 according to a fourth embodiment will be described with reference to FIG. 7. FIG. 7 shows only the magnetic core 3 provided in the reactor 1. The reactor 1 according to the fourth embodiment differs from the reactor 1 according to the first and second embodiments in the division state of the magnetic core 3. Configurations other than the division state of the magnetic core 3 of the reactor 1 in this example are the same as those of the reactor 1 according to the first and second embodiments.

The first divided core 3A in this example is constituted by the first end core portion 31, a part of the middle core portion 30, a part of the first side core portion 33, and a part of the second side core portion 34. The through hole 4 is provided in the first end core portion 31. The first divided core 3A as viewed from the Z direction is substantially E-shaped. The first divided core 3A is preferably formed by a power compact molded body.

The second divided core 3B in this example is constituted by the second end core portion 32, a part of the middle core portion 30, a part of the first side core portion 33, and a part of the second side core portion 34. The second divided core 3B as viewed from the Z direction is substantially E-shaped. The middle core portion 30, the first side core portion 33, and the second side core portion 34 of the second divided core 3B are respectively longer than the middle core portion 30, the first side core portion 33, and the second side core portion 34 of the first divided core 3A. The second divided core 3B is preferably formed by a molded body made of a composite material.

Also according to the reactor 1 in this example, effects that are similar to those of the reactor 1 according to the first embodiment are achieved.

Fifth Embodiment

Figure 8:
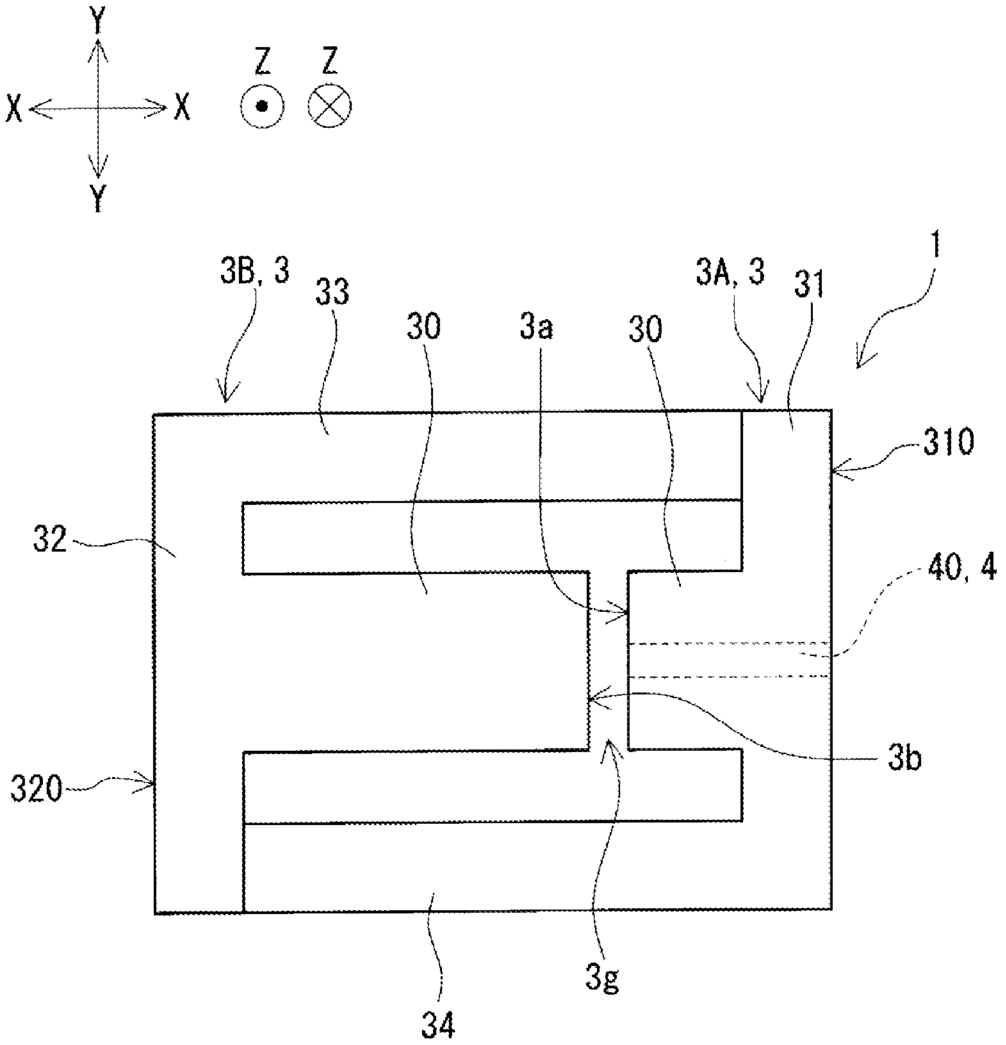
FIG. 8 is a schematic top view of a magnetic core provided in a reactor according to a fifth embodiment.

A reactor 1 according to a fifth embodiment will be described with reference to FIG. 8. FIG. 8 shows only the magnetic core 3 provided in the reactor 1. The reactor 1 according to the fifth embodiment differs from the reactor 1 according to the first and second embodiments, in the division state of the magnetic core 3. Configurations other than the division state of the magnetic core 3 of the reactor 1 in this example are the same as those of the reactor 1 according to the first and second embodiments.

The first divided core 3A in this example is constituted by the first end core portion 31, a part of the middle core portion 30, and the second side core portion 34. The through hole 4 is provided in the first end core portion 31. The first divided core 3A as viewed from the Z direction is substantially F-shaped. The first divided core 3A is preferably formed by a power compact molded body.

The second divided core 3B in this example is constituted by the second end core portion 32, a part of the middle core portion 30, and the first side core portion 33. The second divided core 3B as viewed from the Z direction is substantially F-shaped. The middle core portion 30 of the second divided core 3B is longer than the middle core portion 30 of the first divided core 3A. The second divided core 3B is preferably formed by a molded body made of a composite material.

Also according to the reactor 1 in this example, effects that are similar to those of the reactor 1 according to the first embodiment are achieved.

Sixth Embodiment

Converter and Electrical Power Conversion Apparatus

A reactor 1 according to the embodiments can be used for a usage that satisfies the following current-carrying condition. The current-carrying condition may be, for example, that the maximum DC current is about 100 A or higher and 1000 A or lower, the average voltage is about 100 V or higher and 1000 V or lower, and a used frequency is about 5 kHz or higher and 100 kHz or lower. The reactor 1 according to the embodiments is typically used as a constituent component of a converter that is mounted in, for example, a vehicle such as an electric automobile or a hybrid automobile, or a constituent component of a power conversion apparatus that includes this converter.

Figure 9:
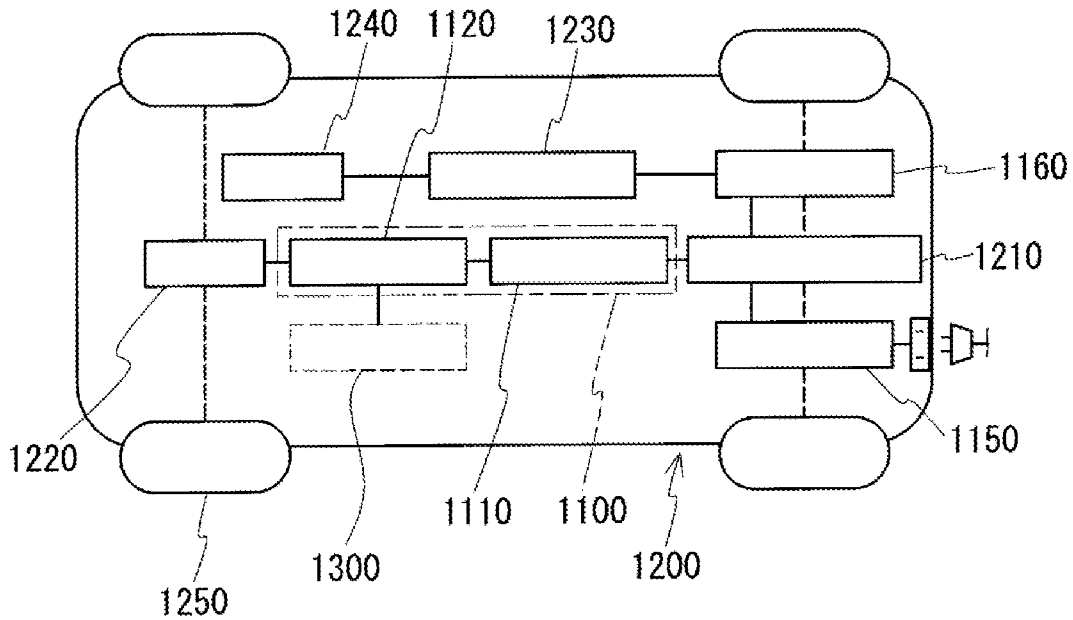
FIG. 9 is a configuration diagram schematically showing a power source system of a hybrid automobile.

As shown in FIG. 9, a vehicle 1200 such as a hybrid automobile or an electric automobile includes a main battery 1210, an electric power conversion apparatus 1100 connected to the main battery 1210, and a motor 1220 that is driven using power supplied from the main battery 1210 and is used for travelling. The motor 1220 is typically a three-phase AC motor, which drives wheels 1250 when the vehicle is travelling, and functions as an electricity generator at the time of regeneration. In a case of a hybrid automobile, the vehicle 1200 includes an engine 1300 in addition to the motor 1220. FIG. 9 shows an inlet as a charging section of the vehicle 1200, but an aspect can also be adopted in which a plug is provided.

The power conversion apparatus 1100 includes a converter 1110 that is connected to the main battery 1210, and an inverter 1120 that is connected to the converter 1110, and performs mutual conversion between a DC current and an AC current. When the vehicle 1200 is travelling, the converter 1110 shown in this example steps up an input voltage of the main battery 1210 that is about 200 V or higher and 300 V or lower, to about 400 V or higher and 700 V or lower, and supplies power to the inverter 1120. At the time of regeneration, the converter 1110 steps down an input voltage output from the motor 1220 via the inverter 1120, to a DC voltage suitable for the main battery 1210, so as to charge the main battery 1210. The input voltage is a DC voltage. The inverter 1120 converts a DC current stepped up by the converter 1110, into a predetermined AC current and supplies power to the motor 1220, when the vehicle 1200 is travelling, and converts an AC output from the motor 1220 into a DC current and outputs the DC current to the converter 1110 at the time of regeneration.

Figure 10:
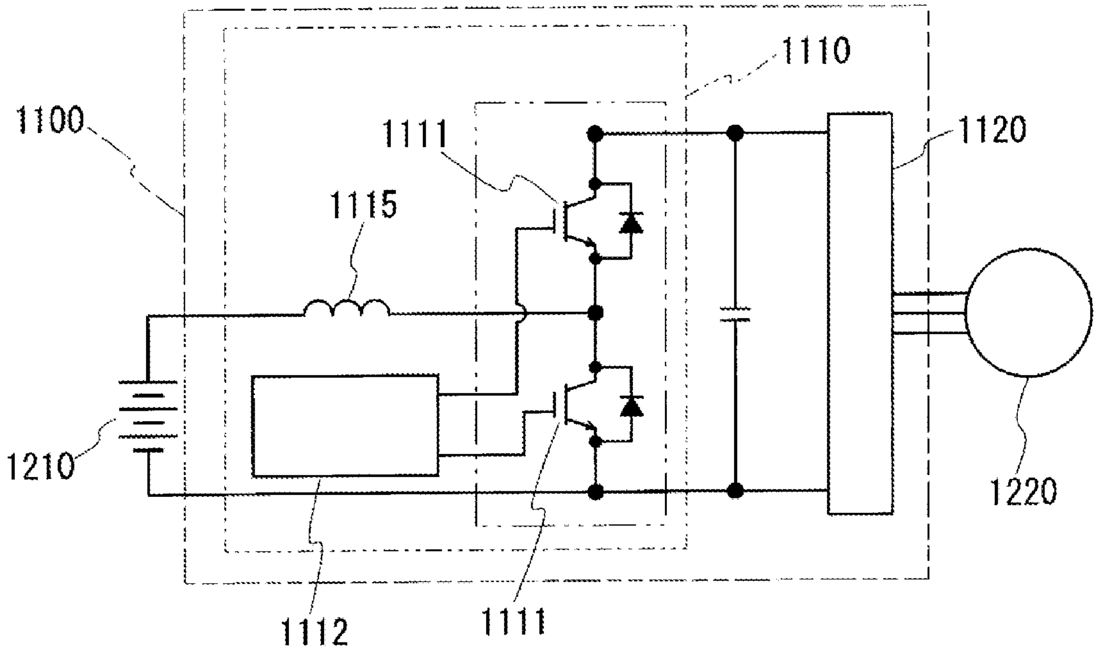
FIG. 10 is a circuit diagram schematically showing an example of a power conversion apparatus that includes a converter.

As shown in FIG. 10, the converter 1110 includes a plurality of switching elements 1111, a drive circuit 1112 that controls operations of the switching elements 1111, and a reactor 1115, and converts an input voltage by being repeatedly switched on and off. Here, converting an input voltage is stepping up/stepping down a voltage. A power device such as a field-effect transistor or an insulated gate bipolar transistor is used for the switching elements 1111. The reactor 1115 has a function of smoothing a change in a current that is about to increase/decrease in accordance with a switching operation, using a property of a coil to inhibit a change in a current that is about to flow through a circuit. The reactor 1 according to an embodiment is provided as the reactor 1115.

In addition to the converter 1110, the vehicle 1200 includes a converter 1150 for a power supply apparatus connected to the main battery 1210, and a converter 1160 for an auxiliary machine power source that is connected to a sub battery 1230 and the main battery 1210 functioning as the power sources for auxiliary equipment 1240, and that converts a high voltage of the main battery 1210 into a low voltage. The converter 1110 typically performs DC-DC conversion, but the converter 1150 for a power supply apparatus and the converter 1160 for an auxiliary machine power source perform AC-DC conversion. Some converters 1150 for a power supply apparatus perform DC-DC conversion. As a reactor of the converter 1150 for a power supply apparatus and a reactor of the converter 1160 for an auxiliary machine power source, it is possible to use a reactor that has a configuration similar to that of the reactor 1 according to an embodiment, and whose size, shape, and the like have been changed as appropriate. In addition, the reactor 1 according to an embodiment or the like can also be used as a converter that converts an input power and only steps up or down a voltage.

Performances of the converter 1110 and the power conversion apparatus 1100 that include the reactor 1 according to an embodiment that has high heat dissipation are unlikely to decrease due to current-carrying.

Tests

Test Example 1

In Test Example 1, influence that the through hole 4 has on the inductance and total loss of the reactor 1 was examined Specifically, an analysis was conducted on a reactor that does not include the through hole 4, namely a sample No. 1 and the reactors 1 that include the through hole 4, namely samples No. 2 to 6. The only difference between the reactor (sample No. 1) and the reactors 1 (samples No. 2 to 6) was the presence or absence of the through hole 4. In addition, only difference between the reactors (samples No. 2 to 6) is a cross-section area of the through hole 4. The magnetic core in each sample is constituted by a T-shaped first divided core and an E-shaped second divided core described in the first embodiment.

[Sample No. 1]

The first divided core 3A . . . a power compact molded body

The second divided core 3B . . . a molded body made of a composite material

The through hole 4 . . . none

[Sample No. 2]

The diameter of the through hole 4 . . . 5 mm

S1/S2 . . . 0.02

S1=the area of a transverse section of the through hole 4, and S2=the area inside the contour line of a transverse section of the middle core portion 30

[Sample No. 3]

The diameter of the through hole 4 . . . 7.5 mm

S1/S2 . . . 0.04

[Sample No. 4]

The diameter of the through hole 4 . . . 10 mm

S1/S2 . . . 0.09

[Sample No. 5]

The diameter of the through hole 4 . . . 12.5 mm

S1/S2 . . . 0.14

[Sample No. 6]

The diameter of the through hole 4 . . . 15 mm

S1/S2 . . . 0.2

JMAG-Designer19.0 (manufactured by JSOL corporation) that is commercially available software was used for simulation of the inductances and total losses of the samples. In an inductance analysis, inductances (pH) when a current flows through the coil 2 were obtained. The current was changed within a range of 0 to 300 A. Table 1 shows inductances when the current value is 0 A, 100 A, 200 A, and 300 A. An inductance is expressed by a percentage where 100% represents the inductance of sample No. 1 when the current value is 0 A.

In addition, in a total loss analysis, a total loss (W) was obtained based on the magnetic flux density distribution and the current density distribution when each sample was driven with a DC current of 0 A, an input voltage of 200 V, an output voltage of 400 V, and a frequency of 20 kHz. A total loss in this example includes iron loss of the magnetic core 3, coil loss, and the like. Table 1 shows the result. A total loss is expressed by a percentage where 100% represents the total loss of sample No. 1.

Table 1 also shows weight reduction ratios (%) of the magnetic core 3 that are based on the through hole 4 being provided. A weight reduction ratio is expressed by a percentage where 100% represents the mass of sample No. 1.

TABLE 1

| Item | | Unit | Sample No. | | | | | |
|---|---|---|---|---|---|---|---|---|
| | | | No. 1 | No. 2 | No. 3 | No. 4 | No. 5 | No. 6 |
| S1/S2 | | — | 0 | 0.02 | 0.04 | 0.09 | 0.14 | 0.2 |
| Inductance | 0 A | % | 100.0 | 99.9 | 99.6 | 99.2 | 98.5 | 97.6 |
| | 100 A | | 79.1 | 79.0 | 78.9 | 78.6 | 78.3 | 77.7 |
| | 200 A | | 56.9 | 56.8 | 56.7 | 56.6 | 56.3 | 56.0 |
| | 300 A | | 35.9 | 35.9 | 35.9 | 35.9 | 35.9 | 35.8 |
| Total loss | | % | 100.0 | 100.2 | 100.4 | 100.7 | 101.3 | 102.2 |
| Weight reduction ratio | | % | 100 | 99 | 97 | 95 | 93 | 89 |

As shown in table 1, compared with the reactor (sample No. 1) that is a based model, there is a trend in which the larger the area of the transverse section of the through hole 4 is, the more the inductance of the reactor 1 decreases and the total loss increases. That is to say, reduction in the weight of the reactor 1 and the magnetic properties of the reactor 1 have a tradeoff relationship. However, due to the through hole 4 being disposed in an intermediate portion in the outer surface 310 of the first end core portion 31, a decrease in the inductance and an increase in the total loss were insignificant. Here, from the viewpoint of maintaining the magnetic properties of the reactor 1, a decrease rate of the inductance and an increase rate of the total loss caused by the through hole 4 being provided are preferably 1% or lower. From this viewpoint, S1/S2 is preferably about 0.02 or larger and 0.14 or smaller.

LIST OF REFERENCE NUMERALS

1 Reactor
2 Coil
21 First winding portion
2*a*, 2*b* End portion
211 First end surface
212 Second end surface
213 First side surface
214 Second side surface
3 Magnetic core
3*a* First end surface
3*b* Second end surface
3*g* Gap
3*r* Rib
3A First divided core
3B Second divided core
30 Middle core portion
31 First end core portion
32 Second end core portion
33 First side core portion
34 Second side core portion
310, 320 Outer surface
4, 40 Through hole
5 Resin molded portion
1100 Electrical power conversion apparatus
1110 Converter
1111 Switching element
1112 Drive circuit
1115 Reactor
1120 Inverter
1150 Converter for power supply apparatus
1160 Converter for auxiliary machine power source
1200 Vehicle
1210 Main battery
1220 Motor
1230 Sub battery
1240 Auxiliary equipment
1250 Wheel
1300 Engine
H Height
L, T0, T1, T2, T3, T4 Length
W Width

What is claimed is:

1. A reactor comprising:
a coil that includes a first winding portion; and a magnetic core,
wherein the magnetic core includes:
a middle core portion disposed inside the first winding portion,
a first end core portion that faces a first end surface of the first winding portion,
a second end core portion that faces a second end surface of the first winding portion,
a first side core portion that is disposed on an outer side of a first side surface of the first winding portion, and connects the first end core portion and the second end core portion to each other, and
a second side core portion that is disposed on an outer side of a second side surface of the first winding portion, and connects the first end core portion and the second end core portion to each other,
the reactor further comprises
a resin molded portion that integrates the coil and the magnetic core together,
the magnetic core includes a first divided core that includes the first end core portion, and a second divided core that includes at least a part of the middle core portion,
the first divided core includes:
a first end surface that faces an internal space of the first winding portion, and
a through hole that passes through the first end core portion from an outer surface thereof to the first end surface,
the second divided core includes
a second end surface that faces the first end surface with a gap therebetween,
a part of the resin molded portion is disposed in the through hole and the gap,
an axis line of the through hole extends along an axial direction of the middle core portion, and
the through hole includes an axis center of the middle core portion.

2. The reactor according to claim 1,
wherein S1/S2 is 0.02 or larger and 0.15 or smaller,
where
S1 indicates an area of a transverse section of the through hole, and
S2 indicates an area inside a contour line of a transverse section of the middle core portion.

3. The reactor according to claim 1,
wherein the second end surface includes an annular rib provided along an outer peripheral edge portion of the second end surface.

4. The reactor according to claim 1,
wherein the first divided core is substantially T-shaped, constituted by the first end core portion and at least a part of the middle core portion, and
the second divided core is substantially E-shaped, constituted by the second end core portion, a remaining part of the middle core portion, the first side core portion, and the second side core portion.

5. The reactor according to claim 1,
wherein the first divided core is a power compact molded body that contains soft magnetic powder.

6. The reactor according to claim 1,
wherein the second divided core is a molded body made of a composite material that contains a resin and soft magnetic powder dispersed in the resin.

7. A converter comprising
the reactor according to claim 1.

8. A power conversion apparatus comprising
the converter according to claim 7.

* * * * *